United States Patent
Waidman et al.

(10) Patent No.: US 10,189,270 B2
(45) Date of Patent: *Jan. 29, 2019

(54) TO CALIBRATE A PRINTER

(71) Applicant: HP INDIGO B.V., Amstelveen (NL)

(72) Inventors: Ran Waidman, Rehovot (IL); Sasi Moalem, Nes Ziona (IL); Gregory Braverman, Nes Ziona (IL); Eyal Shelef, Tel Aviv (IL); Shlomo Harush, Nes Ziona (IL)

(73) Assignee: HP Indigo B.V., Amstelveen (NL)

( * ) Notice: Subject to any disclaimer, the term of this patent is extended or adjusted under 35 U.S.C. 154(b) by 0 days.

This patent is subject to a terminal disclaimer.

(21) Appl. No.: 15/848,245

(22) Filed: Dec. 20, 2017

(65) Prior Publication Data
US 2018/0111386 A1    Apr. 26, 2018

Related U.S. Application Data

(63) Continuation of application No. 15/305,431, filed as application No. PCT/EP2014/058527 on Apr. 25, 2014, now Pat. No. 9,873,261.

(51) Int. Cl.
*B41J 2/21* (2006.01)
*H04N 1/54* (2006.01)
*H04N 1/60* (2006.01)

(52) U.S. Cl.
CPC .............. *B41J 2/2103* (2013.01); *H04N 1/54* (2013.01); *H04N 1/6033* (2013.01)

(58) Field of Classification Search
CPC ........ B41J 2/2103; A61B 12/006; H04N 1/54; H04N 1/6033
See application file for complete search history.

(56) References Cited

U.S. PATENT DOCUMENTS

| | | |
|---|---|---|
| 5,416,613 A | 5/1995 | Rolleston et al. |
| 6,178,007 B1 | 1/2001 | Harrington |
| 9,873,261 B2 * | 1/2018 | Waidman ............... B41J 2/2103 |
| 2007/0188535 A1 | 8/2007 | Elwakil et al. |
| 2007/0201065 A1 | 8/2007 | Huber et al. |
| 2009/0296173 A1 | 12/2009 | Mestha et al. |
| 2010/0079524 A1 | 4/2010 | Saita et al. |
| 2010/0277751 A1 | 11/2010 | Quach |
| 2013/0215440 A1 | 8/2013 | Chandermohan |

FOREIGN PATENT DOCUMENTS

| | | |
|---|---|---|
| EP | 2301757 | 3/2011 |
| WO | WO-2010050946 | 5/2010 |

OTHER PUBLICATIONS

Emmel, P., et al; "Colour Calibration for Colour Reproduction"; ISCAS May 28-31, 2000; Geneva, Switzerland; http://ieeexplore.ieee.org/stamp/stamp.jsp?arnumber=857374.

* cited by examiner

*Primary Examiner* — Lamson Nguyen
(74) *Attorney, Agent, or Firm* — HP Inc. Patent Department

(57) ABSTRACT

An apparatus to calibrate a printer. The apparatus comprises a controller to: control deposition of white printing material on media, the white printing material having an opacity of at least 55%; control deposition of non-white printing material on the white printing material; receive data for at least one sensed characteristic of the non-white printing material; and calibrate the printer using the received data for the at least one sensed characteristic of the non-white printing material.

20 Claims, 4 Drawing Sheets

TO CALIBRATE A PRINTER

CROSS-REFERENCE TO RELATED APPLICATIONS

This application is a Continuation of U.S. application Ser. No. 15/305,431 filed on Oct. 20, 2016, which is a U.S. National Stage Application of and claims priority to International Patent Application No. PCT/EP2014/058527 filed on Apr. 25, 2014, and entitled "TO CALIBRATE A PRINTER", which is hereby incorporated by reference in its entirety.

BACKGROUND

Printer apparatus are usually arranged to deposit printing material (such as ink or toner) on media. The media may include any of: a white substrate; a metallic substrate; a glossy substrate; a transparent substrate; or a non-white substrate.

BRIEF DESCRIPTION

Reference will now be made by way of example only to the accompanying drawings in which.

DETAILED DESCRIPTION

Figure 1:
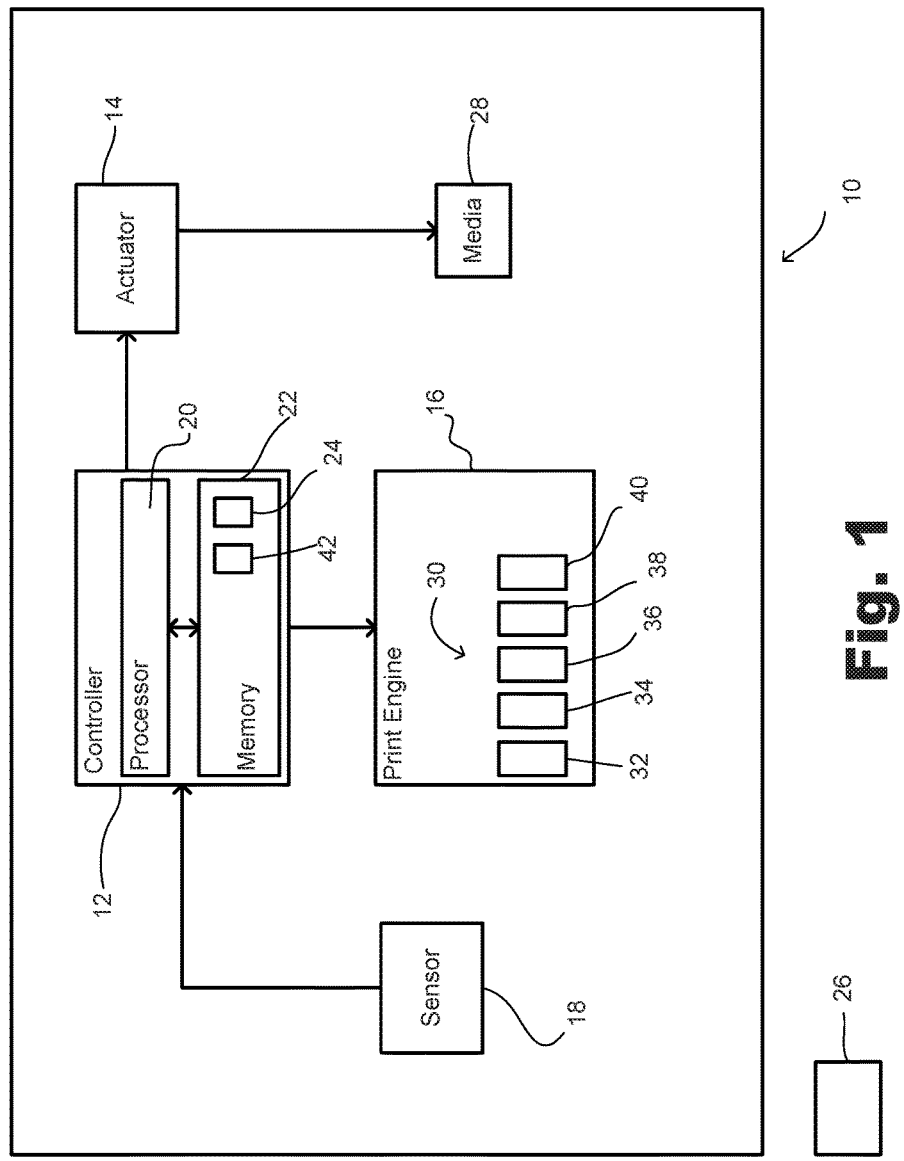
FIG. 1 illustrates a schematic diagram of apparatus according to an example.

FIG. 1 illustrates a schematic diagram of an apparatus 10 (which may also be referred to as a printer apparatus 10) including a controller 12, an actuator 14, a print engine 16 and sensor apparatus 18. The apparatus 10 may be any suitable printer apparatus and may be, for example, an inkjet printer. In some examples, the apparatus 10 may be a module. As used herein, the term 'module' refers to a unit or apparatus that excludes certain parts or components that would be added by an end manufacturer or a user. For example, where the apparatus 10 is a module, the apparatus 10 may comprise the controller 12 and the remaining components of the apparatus 10 (namely, the actuator 14, the print engine 16 and the sensor apparatus 18) may be added by another manufacturer.

The implementation of the controller 12 can be in hardware alone (for example, a circuit, a processor and so on), have certain aspects in software including firmware alone or can be a combination of hardware and software (including firmware).

The controller 12 may be implemented using instructions that enable hardware functionality, for example, by using executable computer program instructions 24 in a general-purpose or special-purpose processor 20 that may be stored on a computer readable storage medium 22 (disk, memory and so on) to be executed by such a processor 20.

The processor 20 is configured to read from and write to the memory 22. The processor 20 may also comprise an output interface via which data and/or commands are output by the processor and an input interface via which data and/or commands are input to the processor.

The memory 22 stores a computer program 24 comprising computer program instructions that control the operation of the apparatus 10 when loaded into the processor 20. The computer program instructions 24 provide the logic and routines that enables the apparatus 10 to perform the methods illustrated in FIGS. 2 and 3 and described in the following paragraphs. The processor 20 by reading the memory 22 is able to load and execute the computer program 24.

The computer program 24 may arrive at the apparatus 10 via any suitable delivery mechanism 26. The delivery mechanism 26 may be, for example, a non-transitory computer-readable storage medium, a computer program product, a memory device, a record medium such as a compact disc read-only memory (CD-ROM) or digital versatile disc (DVD), an article of manufacture that tangibly embodies the computer program 24. The delivery mechanism may be a signal configured to reliably transfer the computer program 24. The apparatus 10 may propagate or transmit the computer program 24 as a computer data signal.

The actuator 14 may comprise any suitable apparatus for moving media 28 through the apparatus 10. For example, the actuator 14 may comprise a plurality of rollers for engaging the media 28 and moving the media 28 through the apparatus 10. The controller 12 is arranged to control the operation of the actuator 14 to move the media 28.

The media 28 may comprise any suitable substrate for receiving ink. For example, the media 28 may be at least one of: a metallic substrate; a substrate having a relatively glossy surface; a non-white substrate; a transparent substrate. The media 28 may be a web of media, or may be a sheet of media. In some examples, the apparatus 10 may comprise a three dimensional printer (which may also be referred to as an additive manufacturing machine) and in these examples, the media 28 is a three dimensional article.

The print engine 16 may comprise any suitable apparatus for depositing printing material (such as ink, metallic inks, toner and so on) on the media 28. For example, the print engine 16 may comprise at least one inkjet print head for depositing ink on the media 28. The print engine 16 comprises a plurality of inks 30 having different colors. The plurality of inks 30 includes a white ink 32 and non-white inks 34, 36, 38, 40 (such as cyan, yellow, magenta, and black (CYMK)).

The memory 22 stores calibration data 42 for the print engine 16. The controller 12 is arranged to control the operation of the print engine 16, using the calibration data 42, to print at least one of the plurality of inks 30 on the media 28. The calibration data 42 defines what composition of the plurality of inks 30 corresponds to a color in an image to be printed (in other words, the calibration data 42 defines the conversion between the image color space to the printed color space).

The sensor apparatus 18 may include any suitable apparatus for sensing at least one variable of ink on the media 28. For example, the sensor apparatus 18 may include a spectrophotometer, a densitometer, a colorimeter, a scanner, a digital camera and so on. The at least one variable of the ink (which may also be referred to as at least one characteristic of the ink) on the media 28 may include the thickness of the layer of non-white ink; the optical density of the layer of non-white ink; and the color density of the layer of non-white ink. The controller 12 is arranged to receive data from the sensor apparatus 18.

The operation of the apparatus 10 is described in the following paragraphs with reference to FIGS. 2 and 3.

Figure 2:
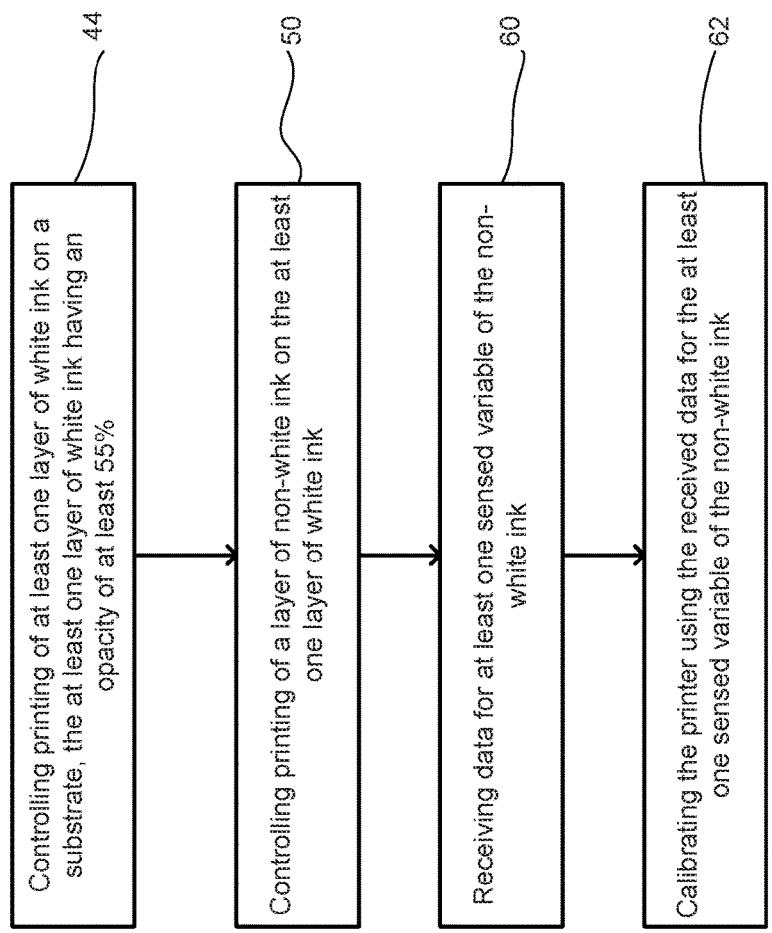
FIG. 2 illustrates a flow diagram of a method according to an example.

FIG. 2 illustrates a flow diagram of a method according to an example.

At block 44, the controller 12 controls the actuator 14 to move the media 28 to the print engine 16. The controller 12 also controls the print engine 16 to print at least one layer of white ink 32 on the media 28. The at least one layer of white ink has an opacity of at least 55%.

Figure 4:
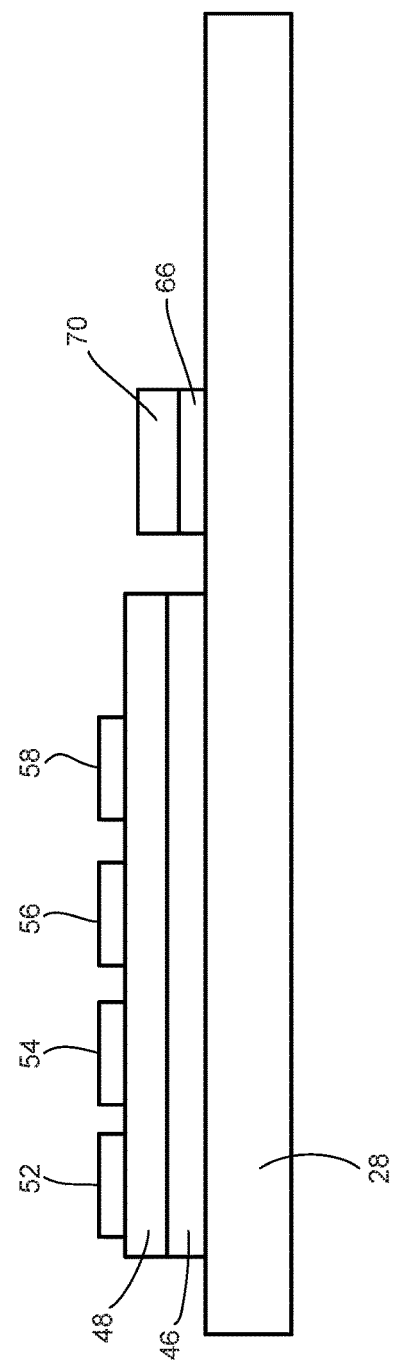
FIG. 4 illustrates a side view diagram of a substrate according to an example.

In one example, as illustrated in FIG. 4, the controller 12 controls the print engine 16 to print a first layer 46 of white ink on the media 28 in a first pass of a print head, and to print a second layer 48 of white ink on the first layer 46 of white ink in a second pass of the print head. The combination of the first layer 46 and the second layer 48 of white ink have an opacity of at least 55%. In other examples, the print head may print a single layer of white ink, or may print three or more layers of white ink.

The white ink may be defined as ink that when deposited on a non-white substrate or non-white ink, the optical density (at specific wavelengths) becomes lower as the height of the white ink layer increases. In other words, there is a negative derivative of delta optical density/delta white ink layer height.

At block 50, the controller 12 controls the print engine 16 to print a layer of non-white ink on the at least one layer of white ink. The layer of non-white ink may cover the whole area of the at least one layer of white ink. In other examples, the layer of non-white ink may cover a part of the area of the at least one layer of white ink (as illustrated in FIG. 4). The layer of non-white ink may comprise a single ink from the non-white inks 34, 36, 38, 40. In other examples, the layer of non-white ink may comprise a plurality of inks (in the same or different proportions) from the non-white inks 34, 36, 38, 40.

In the example illustrated in FIG. 4, the controller 12 controls the print engine 16 to print a first non-white ink 52 on the second layer 48 of white ink, a second non-white ink 54 on the second layer 48 of white ink, a third non-white ink 56 on the second layer 48 of white ink, and a fourth non-white ink 58 on the second layer 48 of white ink.

At block 60, the controller 12 controls the actuator 14 to move the media 28 to the sensor apparatus 18. The controller 12 subsequently receives data for at least one sensed variable (or characteristic) of the non-white ink from the sensor apparatus 18. For example, the data may include information on the sensed color or thickness of the layer of non-white ink.

In the example illustrated in FIG. 4, the media 28 may be moved to the sensor apparatus 18 and the controller 12 receives data for at least one variable of the first, second, third and fourth non-white inks 52, 54, 56, 58 from the sensor apparatus 18.

At block 62, the controller 12 calibrates the apparatus 10 using the data received at block 60. For example, the controller 12 may compare a sensed color of a printed non-white ink with the target color, and determine whether, and to what extent, the calibration data 42 is to be changed. Where the controller 12 determines that the calibration data 42 is to be changed, the controller 12 changes the calibration data 42 stored in the memory 22.

In the example illustrated in FIG. 4, the controller 12 compares the sensed color of the first non-white ink 52 with the target color for the layer 52 and determines whether, and to what extent, the calibration data 42 is to be changed for printing the target color. Where the controller 12 determines that the calibration data 42 is to be changed, the controller 12 changes the calibration data 42 for the target color stored in the memory 22. The controller 12 repeats this operation for second, third and fourth non-white inks 54, 56, 58.

Figure 3:
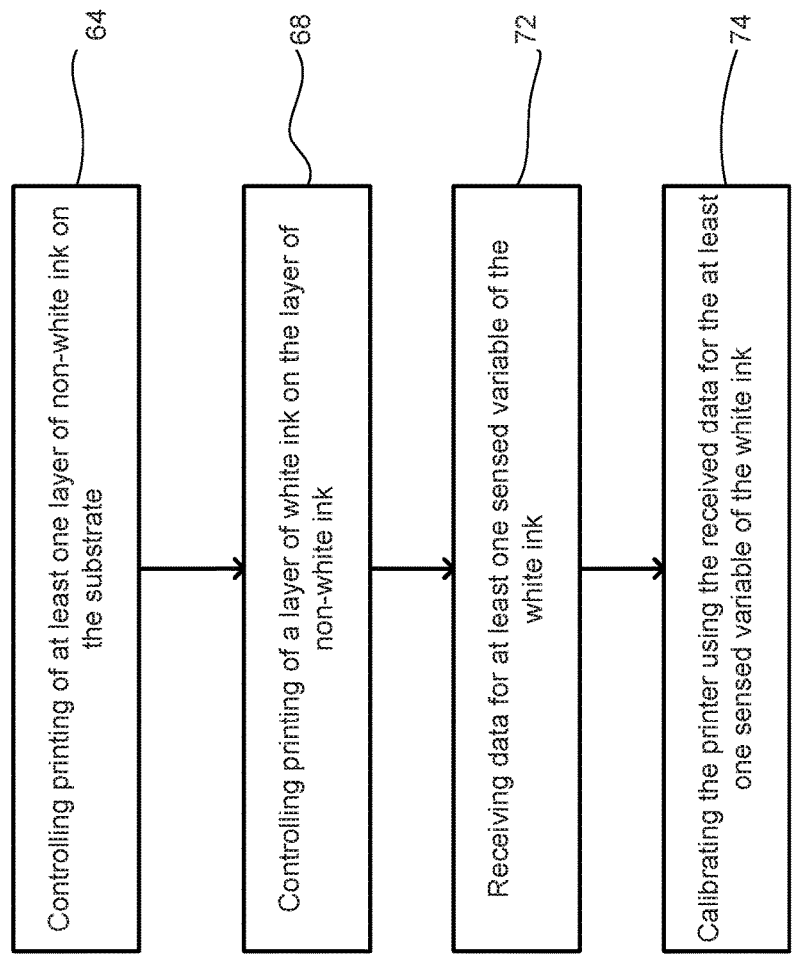
FIG. 3 illustrates a flow diagram of another method according to an example.

FIG. 3 illustrates a flow diagram of another method according to an example.

At block 64, the controller 12 controls the print engine 16 to print at least one layer of non-white ink on the media 28. For example, the controller 12 may control the print engine 16 to print at least one layer of black ink on the media 28. In some examples, block 64 may be performed at substantially the same time as block 44 of FIG. 2. In other examples, block 64 may be performed at any time before, or after, block 44. In the example illustrated in FIG. 4, the controller 12 controls the print engine 16 to print a layer 66 of black ink on the media 28.

At block 68, the controller 12 controls the print engine 16 to print a layer of white ink on the layer of non-white ink printed in block 64. The layer of white ink may cover the whole area of the at least one layer of non-white ink (as illustrated in FIG. 4). In other examples, the layer of white ink may cover a part of the area of the at least one layer of non-white ink. In the example illustrated in FIG. 4, the controller 12 controls the print engine 16 to print a layer 70 of white ink on the layer 66 of black ink.

At block 72, the controller 12 receives data for at least one sensed variable (or characteristic) of the white ink from the sensor apparatus 18. For example, the data may include information on the sensed color of the layer of white ink. Where block 72 is performed at a different time to block 60, the controller 12 may also control the actuator 14 to move the media 28 to the sensor apparatus 18 at block 72.

In the example illustrated in FIG. 4, the media 28 may be moved to the sensor apparatus 18 and the controller 12 receives data for at least one variable of the white ink 70 from the sensor apparatus 18.

At block 74, the controller 12 calibrates the apparatus 10 using the data received at block 72. For example, the controller 12 may compare a sensed color of the printed white ink with the target color (that is, white), and determine whether, and to what extent, the calibration data 42 is to be changed. Where the controller 12 determines that the calibration data 42 is to be changed, the controller 12 changes the calibration data 42 stored in the memory 22.

In some examples, the method illustrated in FIG. 3 may be used to calibrate dot gain of white ink. In more detail, the controller 12 may control the print engine 16 to print a plurality of layers 66, 70, where the layers of white ink 70 include different densities of white dots. At blocks 72 and 74, the controller 12 may receive data for the density of white dots on the black ink layer 66 and then determine whether the dot gain (that is, the density of white dots) is within an acceptable range of densities. Where the dot gain is not within an acceptable range of densities, the controller 12 changes the calibration data 42 to calibrate the dot gain.

The methods illustrated in FIGS. 2 and 3 may provide several advantages. For example, since calibration target colors are printed on white ink (and white ink is printed on a non-white ink such as black ink), the methods enable calibration using a single substrate (since calibration and printing may be carried out on a single substrate). This may enable the methods to be performed automatically and without user intervention since the substrate may not need to be changed.

Furthermore, since the at least one layer of white ink (for receiving a non-white ink) has an opacity of at least 55%, the characteristics (for example, color, glossiness, material, opacity and so on) of the substrate may not affect the calibration of the non-white ink printed on the layer of white ink. In more detail, the at least one layer of white ink changes the surface roughness of the media 28 and also reduces the variance of spectrum reflection between different types of media 28. Consequently, the printing of white ink having an opacity of at least 55% enables calibration to be performed once for a variety of different types of media.

The blocks illustrated in the FIGS. 2 and 3 may represent steps in a method and/or sections of code in the computer program 24. The illustration of a particular order to the blocks does not necessarily imply that there is a required or preferred order for the blocks and the order and arrangement of the block may be varied in some examples. Furthermore, it may be possible for some blocks to be omitted in some examples.

Although examples have been described in the preceding paragraphs, it should be appreciated that modifications to the examples given can be made without departing from the scope as claimed. For example, while the methods illustrated in FIGS. 2 and 3 and described above refer to ink, the methods may be performed for other printing materials such as metallic ink and toner.

Although the processor 20 is illustrated as a single component it may be implemented as one or more separate components some or all of which may be integrated/removable and/or may provide permanent/semi-permanent/dynamic/cached storage.

Although the memory 22 is illustrated as a single component it may be implemented as one or more separate components some or all of which may be integrated/removable and/or may provide permanent/semi-permanent/dynamic/cached storage.

References to 'computer-readable storage medium', 'computer program product', 'tangibly embodied computer program' etc. or a 'controller', 'computer', 'processor' etc, should be understood to encompass not only computers having different architectures such as single/multi-processor architectures and sequential (Von Neumann)/parallel architectures but also specialized circuits such as field-programmable gate arrays (FPGA), application specific circuits (ASIC), signal processing devices and other processing circuitry. References to computer program, instructions, code etc. should be understood to encompass software for a programmable processor or firmware such as, for example, the programmable content of a hardware device whether instructions for a processor, or configuration settings for a fixed-function device, gate array or programmable logic device etc.

Features described in the preceding description may be used in combinations other than the combinations explicitly described.

Although functions have been described with reference to certain features, those functions may be performable by other features whether described or not.

Although features have been described with reference to certain examples, those features may also be present in other examples whether described or not.

Whilst endeavoring in the foregoing specification to draw attention to those features believed to be of particular importance it should be understood that the Applicant claims protection in respect of any patentable feature or combination of features hereinbefore referred to and/or shown in the drawings whether or not particular emphasis has been placed thereon.

What is claimed is:

1. A method to calibrate a printer, the method comprising:
   controlling printing of at least one layer of non-white ink on a substrate;
   controlling printing of a layer of white ink on the layer of non-white ink;
   receiving data for at least one sensed variable of the white ink; and
   calibrating the printer using the received data for the at least one sensed variable of the white ink.

2. The method of claim 1, wherein the at least one layer of non-white ink is at least one layer of black ink.

3. The method of claim 1, wherein calibrating the printer includes calibrating dot gain of white ink.

4. The method of claim 1, further comprising:
   controlling printing of at least one layer of white ink on the same substrate;
   controlling printing of a layer of non-white ink on the at least one layer of white ink;
   receiving data for at least one sensed variable of the non-white ink; and
   calibrating the printer using the received data for the at least one sensed variable of the non-white ink.

5. The method of claim 4, the at least one layer of white ink having an opacity of at least 55%.

6. The method of claim 1, wherein the at least one sensed variable of the non-white ink includes at least one of: thickness of the layer of non-white ink; optical density of the layer of non-white ink; and color density of the layer of non-white ink.

7. The method of claim 1, wherein the substrate is one of: a metallic substrate; a substrate having a relatively glossy surface; a non-white substrate; a transparent substrate.

8. The method of claim 1, wherein the method is performed automatically and without user intervention.

9. An apparatus to calibrate a printer, the apparatus comprising:
   a controller to:
   control deposition of non-white printing material on the media;
   control deposition of white printing material on the non-white printing material;
   receive data for at least one sensed characteristic of the white printing material; and
   calibrate the printer using the received data for the at least one sensed characteristic of the white printing material.

10. The apparatus of claim 9, wherein the controller is further to:
    control deposition of white printing material on media;
    control deposition of non-white printing material on the white printing material;
    receive data for at least one sensed characteristic of the non-white printing material; and
    calibrate the printer using the received data for the at least one sensed characteristic of the non-white printing material.

11. The apparatus of claim 10, wherein the white printing material has an opacity of at least 55%.

12. An apparatus of claim 10, wherein the at least one sensed characteristic of the non-white printing material includes at least one of: thickness of the layer of non-white printing material; optical density of the layer of non-white printing material; and color density of the layer of non-white printing material.

13. An apparatus of claim 10, wherein the media is one of: metallic media; media having a relatively glossy surface; non-white media; transparent media.

14. An apparatus of claim 9, wherein the controller is to calibrate dot gain of white printing material using the received data for the at least one sensed characteristic of the white printing material.

15. An apparatus of claim 9, wherein the controller is to function automatically and without user intervention.

16. A method to calibrate a printer, the method comprising:
- controlling printing of at least one layer of a first ink on a substrate, the first ink having an optical density that decreases as a height of the layer of that first ink increases;
- controlling printing of a layer of a second ink on the at least one layer of first ink;
- receiving data for at least one sensed variable of the second ink; and
- calibrating the printer using the received data for the at least one sensed variable of the second ink.

17. The method of claim 16, wherein the substrate is non-white.

18. The method of claim 16, the at least one layer of first ink having an opacity of at least 55%.

19. The method of claim 16, wherein the at least one sensed variable of the second ink comprises optical density of the layer of second ink.

20. The method of claim 16, wherein the at least one sensed variable of the second ink comprises color density of the layer of second ink.

* * * * *